July 26, 1966   H. BRUN ETAL   3,263,219

INVENTORS
H. BRUN
P. B. GREENE
W. S. HUMPHREY, JR
J. TERZIAN
ATTORNEY

United States Patent Office 3,263,219
Patented July 26, 1966

3,263,219
ELECTRONIC DATA PROCESSING
EQUIPMENT
Herbert Brun, Newton, and Pascal B. Greene, Ashland, Mass., Watts S. Humphrey, Jr., Chappaqua, N.Y., and John Terzian, Winchester, Mass., assignors to Sylvania Electric Products Inc., a corporation of Delaware
Filed Jan. 3, 1963, Ser. No. 249,247
11 Claims. (Cl. 340—172.5)

This invention is concerned with electronic data processing equipment and particularly with an improved real time system suitable for use with such equipment. A typical example of its utility is with the input-output subsystem of a computer of the type disclosed in co-pending U.S. Patent No. 3,061,192, by John Terzian, entitled, "Data Processing System," and assigned to Sylvania Electric Products Inc.

The purpose of a real time system is to allow a peripheral data processing device and a computer to communicate with each other by properly processing the real time data and control information flowing between them. Real time data may be defined as information which is not temporarily stored but is immediately processed upon its receipt at the data processing device, via a communications system, to the computer. Possible sources are radar equipment, weather stations, drone aircraft, another computer, etc. and in most instances the data is of such a high priority nature that it must be immediately considered by the central processor of the computer. The computer also receives control information which may be in the form of an order such as what to do with the real time data or may be a disclosure of the occurrence of a decision-controlling condition or event.

Hitherto, in order to advise a computer what to do with data which it receives, real time systems have required the use of special control circuits and interconnections between communicating devices with a consequent slow down of data transmission and a need for costly extra equipment. Furthermore, the number of separate data acquisition devices capable of servicing one computer on a real time basis is severely limited since a plurality of independent devices at remote locations present traffic control problems.

Accordingly, a primary object of the present invention is to provide an improved input-output system for electronic data processing equipment. Another object is to provide a priority type real time system which allows control information to be interpreted within the receiving computer itself. A further object is to provide an improved real time system having a high speed capability and one which allows many independent data processing devices to service a single computer on a real time basis. Another object is to provide a real time system capable of processing information having various word lengths.

These and related objects are accomplished in one embodiment of the invention by a real time system which features an input unit for receiving data from a communication system, processing it, and transferring it to the central processor of the computer, and an output unit for receiving data from the computer, processing it, and transferring it to the communication system.

The input unit comprises an input register which acts as a buffer for real time data and control information before they are transferred to the computer memory, an address register which specifies where in the computer memory the data is to be stored, and a control unit which controls the operation of these two registers, checks the parity of the real time data, and sends a program interrupt signal to the computer when appropriate control data is received by the input register. The operating program of the central processor interrogates the address register of the input unit to discover where in its own memory the control information has been stored. Then, it extracts this information from its memory, interprets it, and if it is an order, causes it to be executed. Thus, the computer itself handles all control data so that no external devices or interconnections are needed.

The output unit comprises an output register which acts as a buffer for real time and control information before its transfer to the communication system and a control unit which controls the operation of this register, generates a parity bit and an identification bit indicating whether or not the information being transferred is control information.

Other objects and features of the invention will be apparent from the following description and reference to the accompanying drawings, in which.

Figure 1:
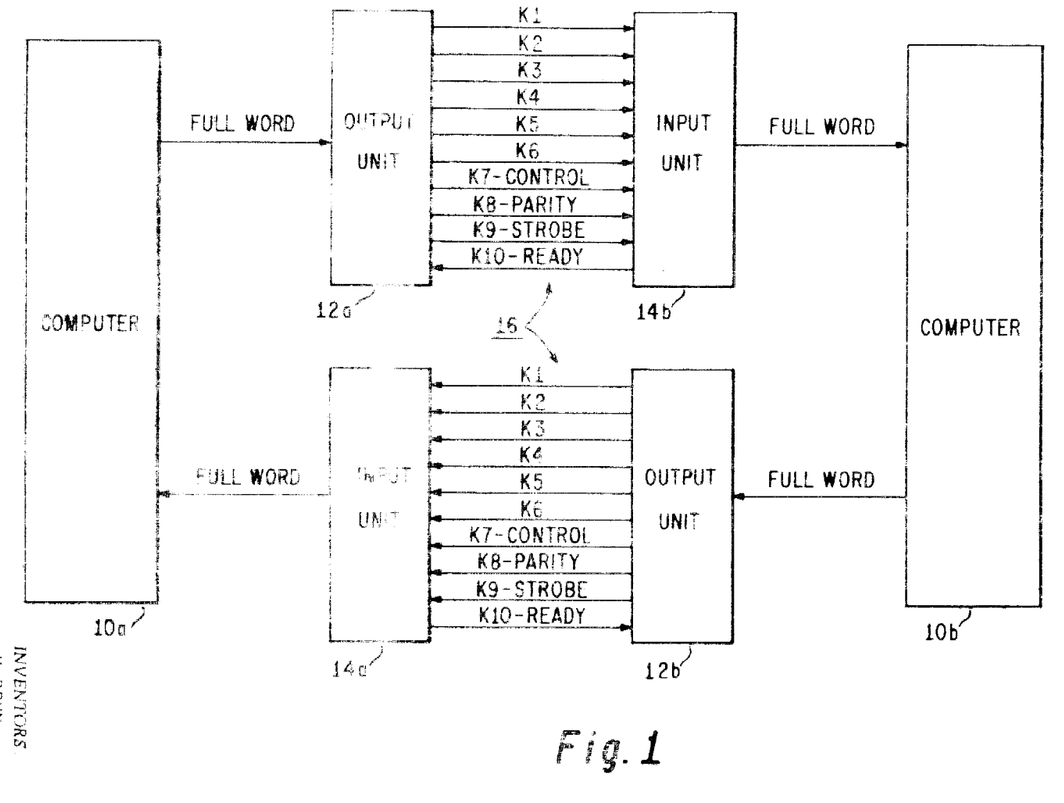
FIG. 1 is a block diagram of a two computer system utilizing the invention.

A two computer system utilizing the invention is shown in FIG. 1. It comprises computers 10a and 10b, output units 12a and 12b, inputs units 14a and 14b, and communications system 16 comprised of separate sets of channels K1–K10 between the output unit of each computer and the corresponding input unit of the other computer. Although computers are referred to in the illustrative embodiment to be described, this does not mean that the invention is limited to utility with them. It is equally applicable to other equipments, devices and data processing systems.

When computer 10a wishes to communicate with computer 10b, its data to be communicated is transferred to output unit 12a. As soon as input unit 14b sends a READY signal K10, output unit 12a transfers data bits on lines K1 to K6, control bit K7, parity bit K8, and STROBE signal K9 over communication system 16 to input unit 14b. For simplicity of explanation, communication system 16 is assumed to be comprised of twenty coaxial lines; however, any suitable communication means could be used. Input unit 14b then assembles a full word six bits at a time and transfers it to computer 10b.

When computer 10b wishes to communicate with computer 10a, it transfers a full word to output unit 12b which, as soon as input unit 14a sends a READY signal K10, transfers consecuitve frames of information to this unit 14a via communications system 16. Each frame comprises data bits on lines K1 to K6, control bit K7, parity bit K8, and STROBE signal K9. A full word is then assembled in input unit 14a which in turn transfers it to computer 10a.

The manner in which this data is transferred will now be explained in more detail.

General description

The real time system is comprised of an input unit 14 and an output unit 12 and, in the system under description, is capable of handling three different types of information: binary coded alpha-numeric characters, binary number sequences, and control characters. Because of their different word lengths, this necessitates three different modes of operation in handling them, which modes are designated as the non-interpret-sign, interpret-sign, and control character modes, respectively. Consequently, in the following explanation of these units there will be three different types of operation described.

Input unit

Figure 2:
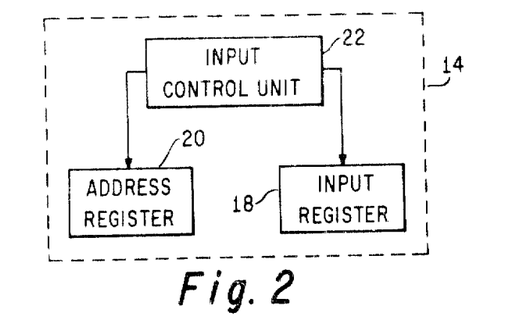
FIG. 2 is a block diagram of the input unit.
Figure 4:
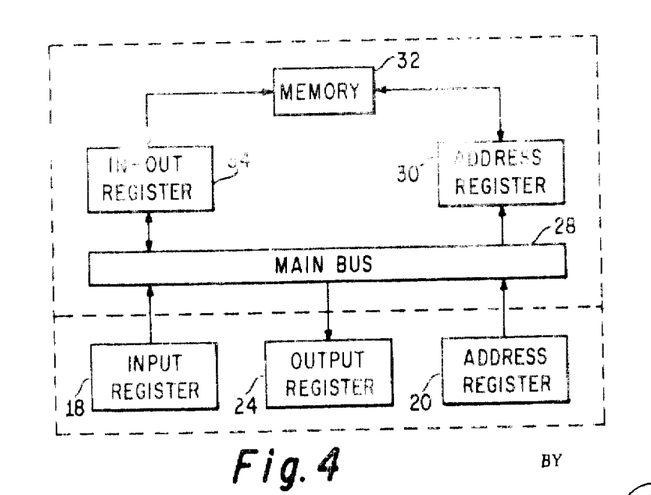
FIG. 4 is a block diagram of a suitable computer memory system and the means by which it is connected to the input register, the output register, and the address register of the real time system.

The real time input unit 14 is shown in FIG. 2. It comprises an input register 18, an address register 20, a control unit 22, and accepts eight bit frames, K1 to K8, from communication system 16, assembles them into full length computer words in input register 18, and then writes them in computer memory 32 (see FIG. 4) at the location specified by address register 20. Such action is asynchronous with respect to the computer 10 and no computer time is required for handling the incoming information other than that required for memory access. In addition, input unit 14 also processes a STROBE signal received from line K9 and generates a READY signal onto line K10.

*Input register.*—The input register 18 is comprised of thirty-seven stages designated as RIR 1–37. Each stage is a set-reset flip-flop which is set to the ONE state when a ONE appears on its set side and reset to the ZERO state when a ONE appears on its reset side. In addition to these stages, logic gating is also provided to assure the proper flow of information.

Figure 5:
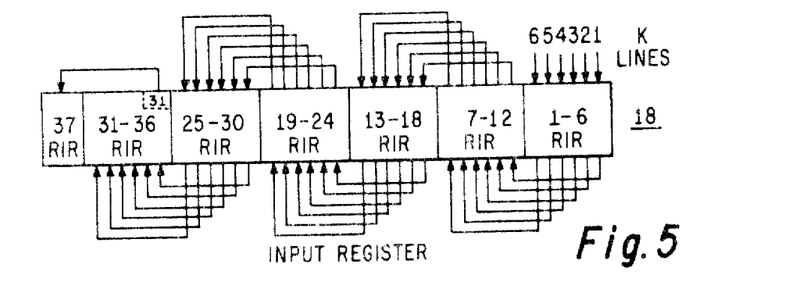
FIG. 5 is a block diagram of the input register.

Data is received from the communications system 16 on lines K1 to K6 in the form of successive six bit frames which are shifted in parallel, six stages at a time, as shown by the arrows of FIG. 5 until register 18 contains a full word. In the non-interpret-sign mode, six shifts are required to accumulate a full word since RIR 37 always contains a ZERO in this mode. The interpret-sign mode requries seven shifts since the first frame contains the sign bit which is initially located in the least significant bit position but must be stored in RIR 37. A control word, however, is only six bits in length so that no shifts are required and it is immediately processed into computer memory 32. The manner in which this shifting is regulated for the different modes will be explained below under the heading Input Control Unit.

Figure 6:
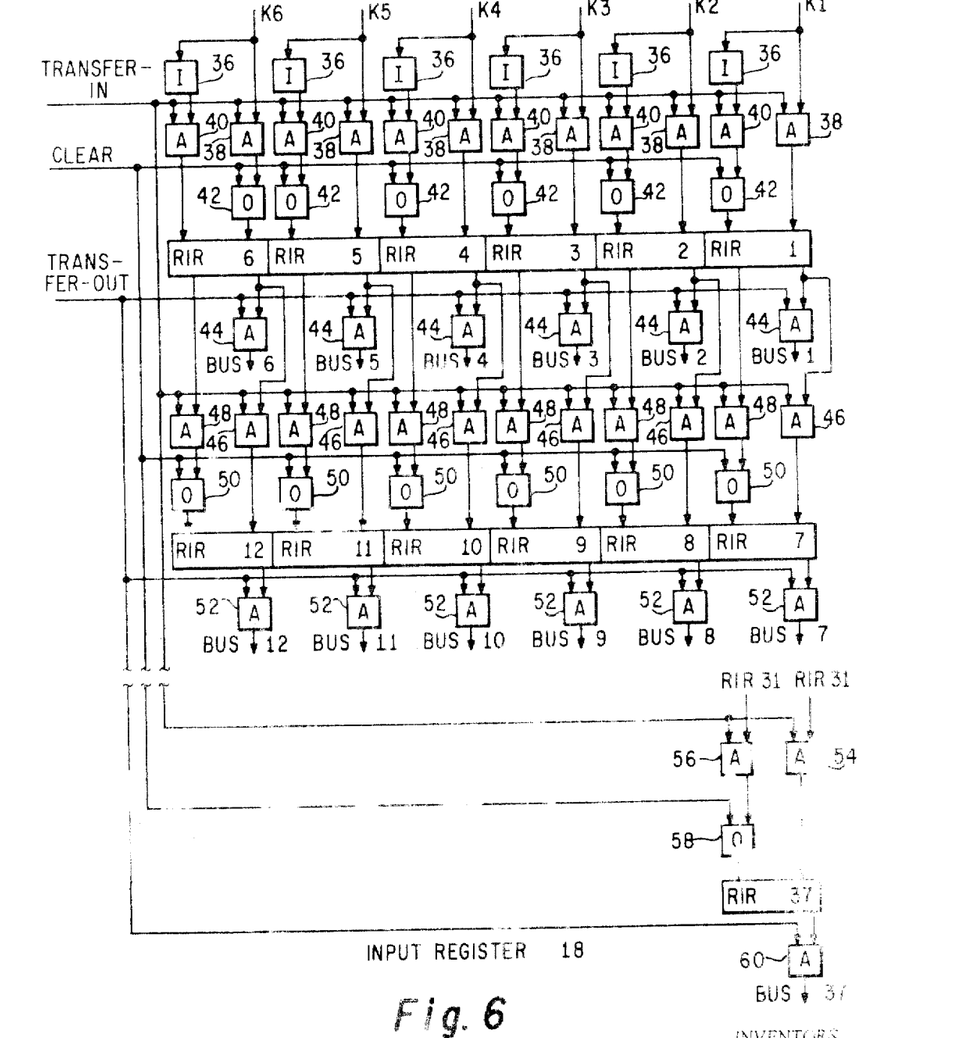
FIG. 6 is a logical representation of the input register.

Since a full word is not loaded into this register in parallel, a means must be provided to indicate when the register contains a full word. Hence, a binary code 100 000 is initially set into stages RIR 1–6 and later its presence in corresponding stages RIR 31–36 is sensed. FIG. 6 shows how, upon the occurrence of a CLEAR signal (from input control unit 22), OR gates 42, 50, and 58 pass this signal through to the reset side of all register stages except RIR 6 which receives the signal on its set side to thereby provide the initial setting of 100 000. Thus, the binary code is inserted into RIR 1–6 and all the remaining stages are in condition to accept information. Each time a frame is received on lines K1 to K6, it is loaded into RIR 16 and the contents of each stage is shifted six places.

If a ONE occurs on any of the K data lines, the TRANSFER-IN signal enables the associated AND gate 38 to pass the ONE signal through and cause the appropriate stage to be set to the ONE state. A ZERO on any line is inverted by its INVERTER gate 36 whose output together with the TRANSFER-IN signal causes AND gate 40 to reset its associated stage to the ZERO state. Thus, the data on lines K1 to K6 is loaded into stages RIR 1–6.

Stages RIR 13–36 and their associated logic are identical to RIR 7–12 and hence have not been shown in FIG. 6. The following description of the transfer of data from stages RIR 1–6 to RIR 7–12 is deemed sufficient to illustrate the manner in which data is transferred between these other stages. If a ONE is stored in any stage RIR 1–6, the TRANSFER-IN level causes AND gate 46 to pass it through setting the appropriate stage. However, if any stage RIR 1–6 is in the reset condition, its reset side contains a ONE and the TRANSFER-IN signal enables its corresponding AND gate 48 to pass this latter ONE through OR gate 50 to reset the associated stage. In this manner data in each register stage is shifted six places.

Only upon the seventh shift which occurs only during the interpret-sign mode, as explained below in the discussion under the heading Input Control Unit, does information ever get transferred into RIR 37. If RIR 31, which represents the sign of the incoming word, is then in the ONE condition, the TRANSFER-IN signal enables AND gate 54 causing RIR 37 to be set. However, if RIR 31 is reset to ZERO condition, AND gate 56 emits a ONE which passses through OR gate 58 and resets RIR 37. Note that at this time the information in RIR 32–36 is lost since there are no stages after RIR 37.

Whenever a full word is stored in input register 18, a TRANSFER-OUT signal is received from input control unit 22 and sent to AND gates 44, 52, and 60. A ONE stored in a stage will enable its corresponding AND gate 44, 52, 60 to place a ONE on its associated bus of main bus 28 (see FIG. 4) which is comprised of thirty-seven separate channels or buses. A ZERO will not enable the AND gate so that a ZERO is placed on the appropriate bus. The manner in which this information is transferred into in-out register 34 from main bus 28 and then into memory 32 is explained in the previously mentioned patent application.

Figure 7A:
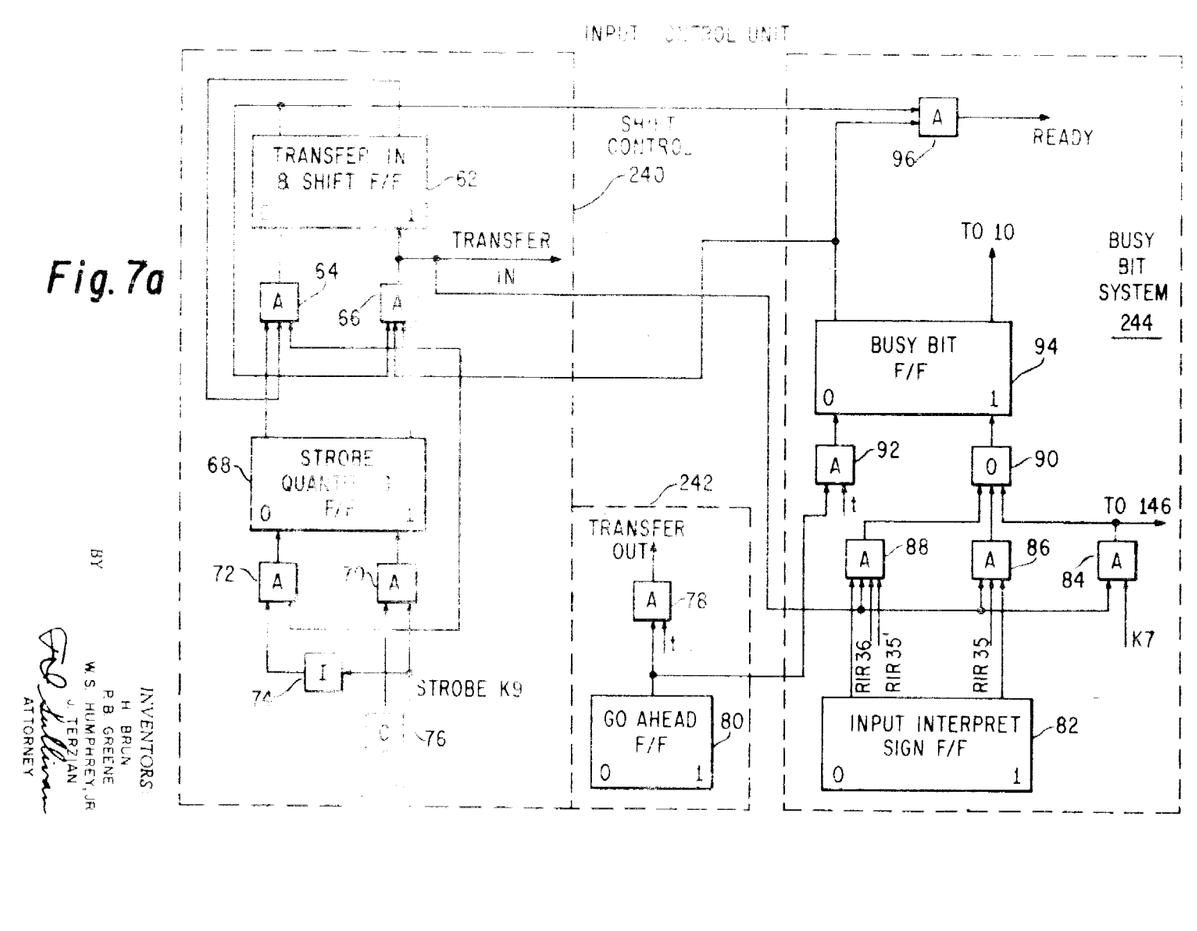
FIGS. 7a, 7b are logical representations of the input control units.
Figure 7B:
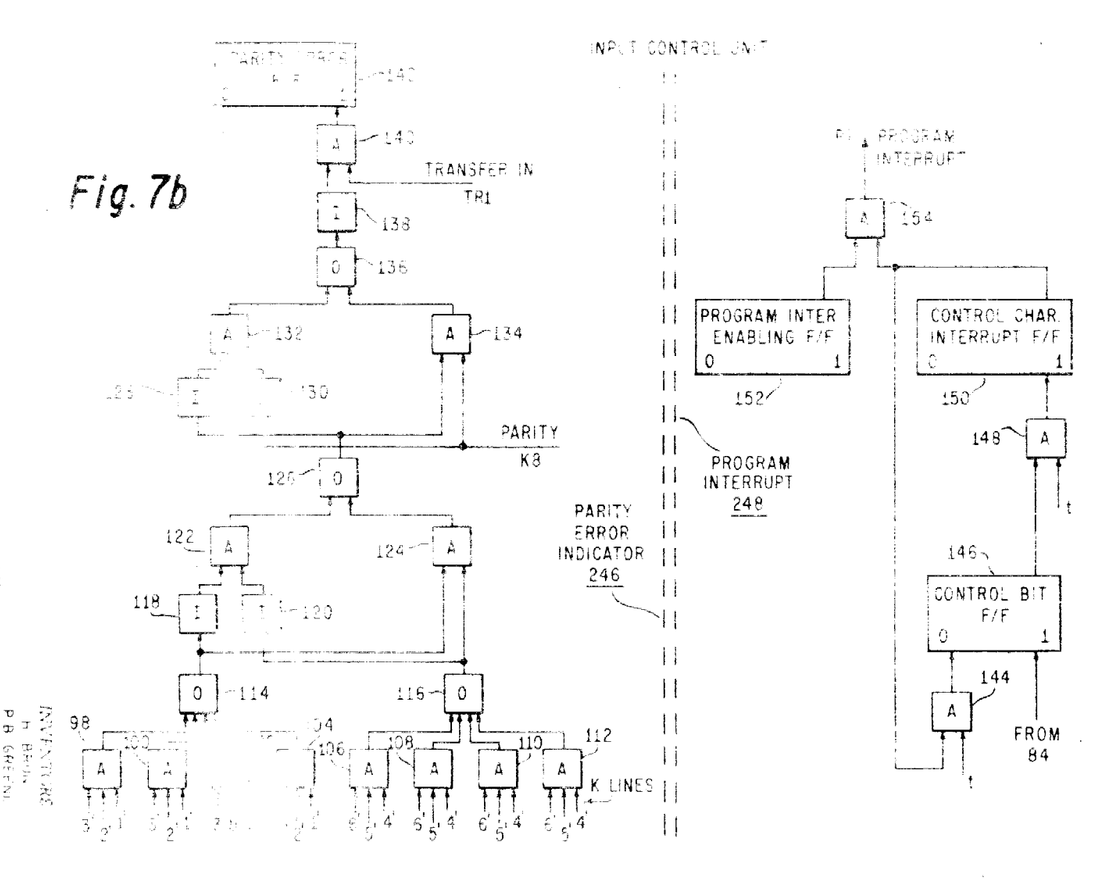

*Input control unit.*—Input control unit 22 is shown in FIGS. 7a and 7b and comprises shift control 240, transfer-out unit 242, busy bit system 244, parity error indicator 246 and program interrupt unit 248. Program interrupt unit 248 (FIG. 7b) consists of control bit flip-flop 146, control character interrupt flip-flop 150, program interrupt enabling flip-flop 152, and their associated logic gates 144, 148, 154. Shift control unit 240 (FIG. 7a) generates the TRANSFER-IN signal to the input register and comprises strobe quantizing flip-flop 68 with its logic gates 70, 72, 74, 76, and the transfer-in and shift flip-flop 62 with its logic gates 64, 66. Busy bit system 244 (FIG. 7a) tells when the input register 18 is fully loaded and comprises input interpret-sign flip-flop 82 and busy bit flip-flop 94 with its logic gates 84, 86, 88, 90, 92, 96. In addition, AND gate 96 generates a READY signal whenever input register 18 is in condition to receive data. Parity error indicating system 246 (FIG. 7b) receives the six data bits K1–K6 and the parity bit (K8) for each frame, checks the parity, and if it is incorrect sets flip-flop 142. It is comprised of logic gates 98 through 140 and parity error flip-flop 142. The transfer-out unit 242 (FIG. 7a) generates the TRANSFER-OUT signal and comprises go-ahead flip-flop 80 and logic gate 78.

The following control operations are common to each of the three modes and hence will be discussed collectively. Whenever data is received on lines K1 to K6 by input register 18 (FIG. 2), it is accompanied by a STROBE signal K9 which is brought into AND gate 70 and INVERTER gate 74 of shift control unit 240 (FIG. 7a). As was mentioned previously, this unit generates the TRANSFER-IN signal. Real time or strobe time is brought into synchronism with computer time by either a *p* or *t* pulse which is generated by the computer timing system (not shown). The occurrence of either pulse enables OR gate 76 which in turn enables AND gate 70 if the STROBE signal is present and strobe quantizing flip-flop 68 becomes set. Whenever this flip-flop 68 is set, the transfer-in and shift control flip-flop 62 and the busy bit flip-flop 94 are both in reset, i.e. ZERO, condition, and either a *p* or *t* pulse is generated by OR gate 76, AND gate 66 has all of its input conditions satisfied and emits the TRANSFER-IN signal. Consequently, each time information is received on lines K1 to K8 a TRANSFER-IN signal is generated providing the reset condition of busy bit flip-flop 94 indicates that more information may be received by input register 18.

All flip-flops must be reset when the strobe pulse ends so that the TRANSFER-IN signal will be terminated and the READY signal will be produced by AND gate 96. If no strobe pulse is present, INVERTER gate 74 emits a ONE which together with either a *p* or *t* pulse from OR gate 76 enables AND gate 72 causing strobe quantizing flip-flop 68 to be reset. When this is reset, the transfer-in and shift control flip-flop 62 is in set condition, and either a *p* or *t* signal is received from OR gate 76, the input conditions for AND gate 64 are satisfied and flip-flop 62 is reset to ZERO. The reset condition of flip-flop 68 prevents AND gate 66 from sending out the TRANSFER-IN signal and the reset conditions of flip-flops 62 and 94 enable AND gate 96 to send a READY signal to K10.

Parity checker 246 (FIG. 7b) first generates the odd parity for the data received on lines K1–K6 and compares the result to the odd parity bit received on line K8. Data lines K1–K6 are divided into two sections and the odd parity of lines K1–K3 is generated by OR gate 114 and the odd parity of lines K4–K6 by OR gate 116. There are four possible conditions under which a ONE parity bit is generated, namely, all bits are ZERO's or when any one bit is a ZERO and the other two bits are ONE's. The NOT designation with any K line numeral indicates that the inversion of the signal on that line is being used. Hence, AND gates 98, 106 generate a ONE parity bit when the corresponding K lines contain ZERO's, and AND gates 100, 102, 104, 108, 110, 112 generate a ONE when one bit is in the ZERO state and the others are in the ONE state. If none of these conditions are met in a group, the corresponding OR gate 114 or 116 will generate a ZERO. Consequently, additional circuitry is not needed to produce a ZERO parity when it is appropriate.

The odd parity for bits K1–K6 may now be found from the two parity bits just obtained at the outputs of OR gates 114 and 116, and it will be a ONE only if both are ONE's or both are ZERO's. If the outputs from OR gates 114 and 116 are ONE's, AND gate 124 produces a ONE which is transferred through OR gate 126. If both are ZERO's, they are inverted in INVERTER gates 118 and 120, AND gate 122 is enabled, and a ONE is transmitted through OR gate 126. If the outputs of OR gates 114 and 116 are in different conditions, a ZERO parity is emitted by OR gate 126.

This generated parity bit is next compared to the one received on line K8. If both are ONE's, AND gate 134 is enabled passing a ONE through OR gate 136. If both are ZERO's, they are inverted to ONE's in INVERTER gates 118 and 120, and AND gate 132 generates a ONE which is transferred through OR gate 136. A ONE at the output of OR gate 136 indicates a correct parity so that when it is inverted by INVERTER gate 138, AND gate 140 will not be activated and parity error flip-flop 142 will not be set. However, a ZERO at the output of OR gate 136 will set it to indicate a parity error.

A full word in the non-interpret-sign mode consists of thirty-six bits. This requires that six frames enter end be shifted in input register 18, and at the end of this time a TRANSFER-OUT signal must be generated by AND gate 78 (FIG. 7a). After five shifts, the binary code 100 000 is located in RIR 31–36. This condition is sensed by AND gate 88 together with the reset condition of interpret-sign flip-flop 82 indicating the non-interpret-sign mode. (FIG. 7a shows only stages RIR 36 and 35 being sensed to simplify the drawing.) Then, upon the next shift, which also causes the sixth frame to be stored, AND gate 88 is activated and it transfers a ONE through OR gate 90 setting busy bit flip-flop 94. This set condition is sensed by computer 10 which then sets go-ahead flip-flop 80. The next *t* pulse activates AND gate 78 which thus produces the TRANSFER-OUT signal after six frames have been stored.

In the interpret-sign mode, a full word consists of thirty-seven bits. The first thirty-six bits indicate data whereas the thirty-seventh bit indicates the sign, a ONE representing a positive sign and a ZERO representing a negative sign. The interpret-sign flip-flop 82 is set by computer 10 in response to a control word received prior to the receipt of the data concerned from communication system 16. Reception of frames by input register 18 is identical to the method used in the non-interpret-sign mode. Again, binary code 100 000 is first set into stages 1 through 6 before any frames are received; however, when this code is shifted into locations 31 through 36, AND gate 88 is not activated because interpret-sign flip-flop 82 has been set. Thus, at this time busy bit flip-flop 94 is not set and more frames may be received.

Seven frames must be stored in this mode of operation. The first frame received is in the form of either 110 000 or 110 001, the least significant bit representing the sign. When it is stored in locations 31 through 36, this frame is sensed by AND gate 86. Upon the occurrence of the next or seventh TRANSFER-IN signal, AND gate 86 is activated causing busy bit flip-flop 94 to be set. This condition is sensed by the computer which then sets go-ahead flip-flop 80. Upon the occurrence of the next *t* pulse, AND gate 78 is enabled and a TRANSFER-OUT signal is produced after seven frames have been stored.

The control character mode of operation is provided to facilitate handling of control words which are generated by one computer 10 and tell another what to do or disclose some fact. A control word in the illustrative system being described comprises one six bit frame and is given top priority so that some form of program recognition of its presence must be provided. Accordingly, a unique program interrupt facility has been designed to accomplish this.

The program interrupt unit 248 (FIG. 7b) comprises control bit flip-flop 146, control character interrupt flip-flop 150, program interrupt enabling flip-flop 152, and their associated logic gates 144, 148, and 154. It differs from previous units by affording a decision-making capability by means of program interrupt enabling flip-flop 152. This will be set by the computer 10 if the control character is to be given top priority as is the typical case. However, if computer 10 is performing a problem which must not be interrupted, it is reset preventing AND gate 154 from sending out a program interrupt signal.

Whenever a frame contains a control character, line K7 contains a ONE, and when the TRANSFER-IN signal is also present, AND gate 84 is enabled (FIG. 7a). This sets busy bit flip-flop 94 as well as control bit flip-flop 146. The set condition of flip-flop 94 is sensed by computer 10 and the TRANSFER-OUT signal is generated in the same manner as was explained above for the other modes. Note that another frame after the control character is not stored in RIR 1–6 because it is line K7 which causes busy bit flip-flop 94 to be set and not information which first must be stored and then upon the occurrence of the next TRANSFER-IN signal cause such setting action.

When the next *t* pulse occurs, AND gate 148 (FIG. 7b) is activated causing control character interrupt flip-flop 150 to be set. Since both flip-flop 150 and 152 are in this condition, AND gate 154 is enabled causing a program interrupt signal to be generated to computer 10 which notes the address of register 20, extracts the control word from this address, and processes it. The output of flip-flop 150 together with the next *t* pulse activate AND gate 144 and cause control bit flip-flop 146 to be reset so that a new program interrupt signal may be generated on receipt of the next control word.

*Address register.*—The address register 20 shown in

Figure 8:
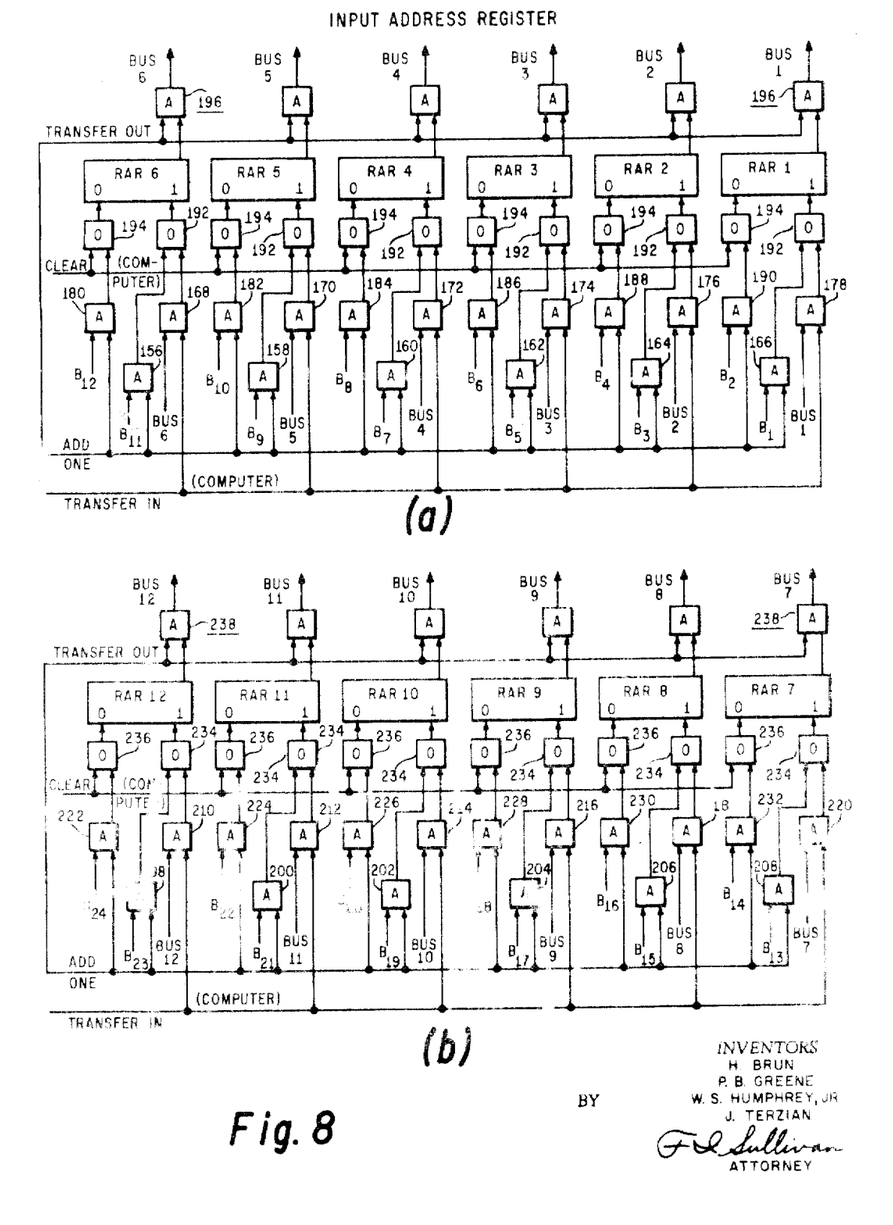
FIGS. 8a, 8b are logical representations of the input address register.

FIG. 2 and in more detail in FIGS. 8a and 8b is comprised of twelve set-reset flip-flop stages designated as RAR 1-12 and logic gating to assure the proper flow of information in and out of these stages. It is actually a conventional counter which is stepped one place after each access to computer address register 30 (FIG. 4) and may be operated by either computer 10 or control unit 22. It is used to designate where in the computer memory 32 the real time information is to be stored.

Whenever an address is to be written into register 20, computer 10 sends a CLEAR signal which passes through OR gates 194 and resets all the stages. The address is then sent over buses 1-12 of main bus 28 (see FIG. 4). A ONE bit on any bus 1-12 together with a TRANSFER-IN signal from computer 10 will cause its associated AND gate 168-178, 210-220 to pass a signal through OR gate 192 setting the proper stage. However, if the bit is a ZERO, the stage will remain in its reset condition.

When information is to be transferred out of input register 18, the TRANSFER-OUT signal is received by address register 20 at a prior time in the basis cycle of the machine to cause AND gates 196 to transfer the contents of this register to buses 1-12 of main bus 28, which in turn causes it to be stored in computer address register 30 (FIG. 4) to thus determine the location in the computer memory to which the contents of the input register is to be transferred. The same signal which energizes the TRANSFER-OUT in the address register of FIGS. 8a and 8b also energizes the ADD ONE in order to cause register 20 to increase its contents by a count of one.

For the purpose of simplification, FIGS. 8a and 8b are shown as containing single inputs with accompanying B designations. However, in most instances each of these inputs actually represents a number of inputs as is shown by the following:

| Input | AND Gate | No. Represented | Inputs Represented |
|---|---|---|---|
| B₁ | 166 | 1 | RAR—1′. |
| B₂ | 190 | 1 | RAR—1. |
| B₃ | 164 | 2 | RAR—1, 2′. |
| B₄ | 188 | 2 | RAR—1, 2. |
| B₅ | 162 | 3 | RAR—1, 2, 3′. |
| B₆ | 186 | 3 | RAR—1, 2, 3. |
| B₇ | 160 | 4 | RAR—1, 2, 3, 4′. |
| B₈ | 184 | 4 | RAR—1, 2, 3, 4. |
| B₉ | 158 | 5 | RAR—1, 2, 3, 4, 5′. |
| B₁₀ | 182 | 5 | RAR—1, 2, 3, 4, 5. |
| B₁₁ | 156 | 6 | RAR—1, 2, 3, 4, 5, 6′. |
| B₁₂ | 180 | 6 | RAR—1, 2, 3, 4, 5, 6. |
| B₁₃ | 208 | 7 | RAR—1, 2, 3, 4, 5, 6, 7′. |
| B₁₄ | 232 | 7 | RAR—1, 2, 3, 4, 5, 6, 7. |
| B₁₅ | 206 | 8 | RAR—1, 2, 3, 4, 5, 6, 7, 8′. |
| B₁₆ | 230 | 8 | RAR—1, 2, 3, 4, 5, 6, 7, 8. |
| B₁₇ | 240 | 9 | RAR—1, 2, 3, 4, 5, 6, 7, 8, 9′. |
| B₁₈ | 228 | 9 | RAR—1, 2, 3, 4, 5, 6, 7, 8, 9. |
| B₁₉ | 202 | 10 | RAR—1, 2, 3, 4, 5, 6, 7, 8, 9, 10′. |
| B₂₀ | 226 | 10 | RAR—1, 2, 3, 4, 5, 6, 7, 8, 9, 10. |
| B₂₁ | 200 | 11 | RAR—1, 2, 3, 4, 5, 6, 7, 8, 9, 10, 11′. |
| B₂₂ | 224 | 11 | RAR—1, 2, 3, 4, 5, 6, 7, 8, 9, 10, 11. |
| B₂₃ | 198 | 12 | RAR—1, 2, 3, 4, 5, 6, 7, 8, 9, 10, 11, 12′. |
| B₂₄ | 222 | 12 | RAR—1, 2, 3, 4, 5, 6, 7, 8, 9, 10, 11, 12. |

From this it may be seen that a stage will be set when all the stages to its right are in the set condition and it is in the reset condition. It is reset when all the stages to its right and itself are in the set condition. This insures proper counting of register 20 upon receipt of the ADD ONE signal each time information is transferred out.

*Output unit*

Figure 3:
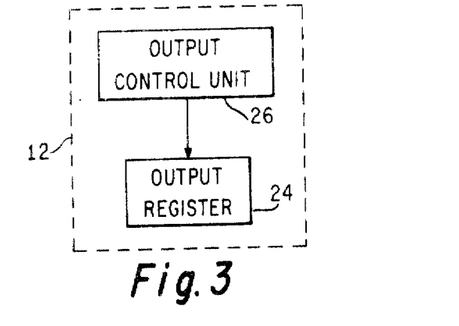
FIG. 3 is a block diagram of the output unit.

The real time output unit 12 is shown in FIG. 3 and comprises an output register 24 and an output control unit 26. Its input is in the form of full length words from computer 10. Upon receipt of the READY signal from communication system 16 when input unit 14 is in condition to receive information, it transfers eight bit frames, K1 to K8, and a STROBE signal out to this system 16.

*Output register*—Output register 24 (FIGS. 3, 4, and 9) is comprised of thirty-seven set-reset flip-flop stages with associated gating logic, code flip-flops 150, and data output logic 152.

Figure 9:
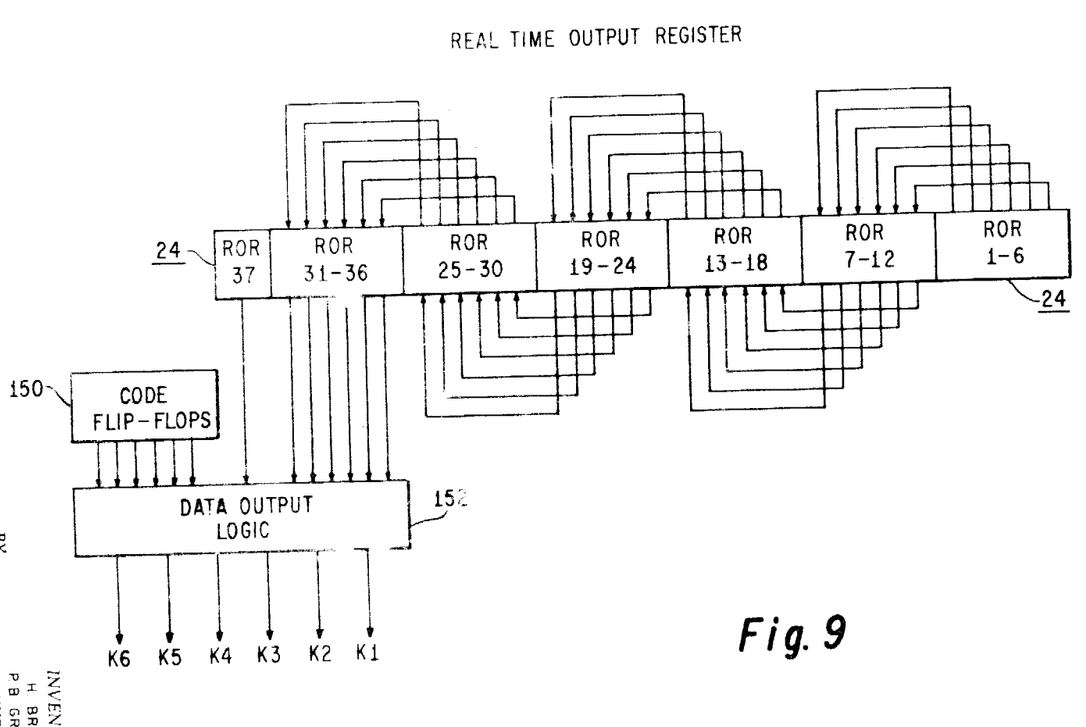
FIG. 9 is a block diagram of the means for generating real time data.

Data is initially received from memory 10 via main bus 28 in the form of full information words. By successive six place shifts to the left, as shown in FIG. 9, it is extracted six bits at a time from stages ROR 31-36 for transmission to communication system 16. In the non-interpret-sign mode, information is only contained in stages ROR 1-36 so that only six shifts are needed. The interpret-sign mode requires seven shifts since data is located in all thirty-seven stages of the register. The contents of ROR 37 and code flip-flops 150 form the first frame of this latter mode whereas the six other frames are stored in ROR 1-36. The control character mode requires only one shift since data is in the form of six bits which are initially loaded in ROR 31-36.

Figure 10A:
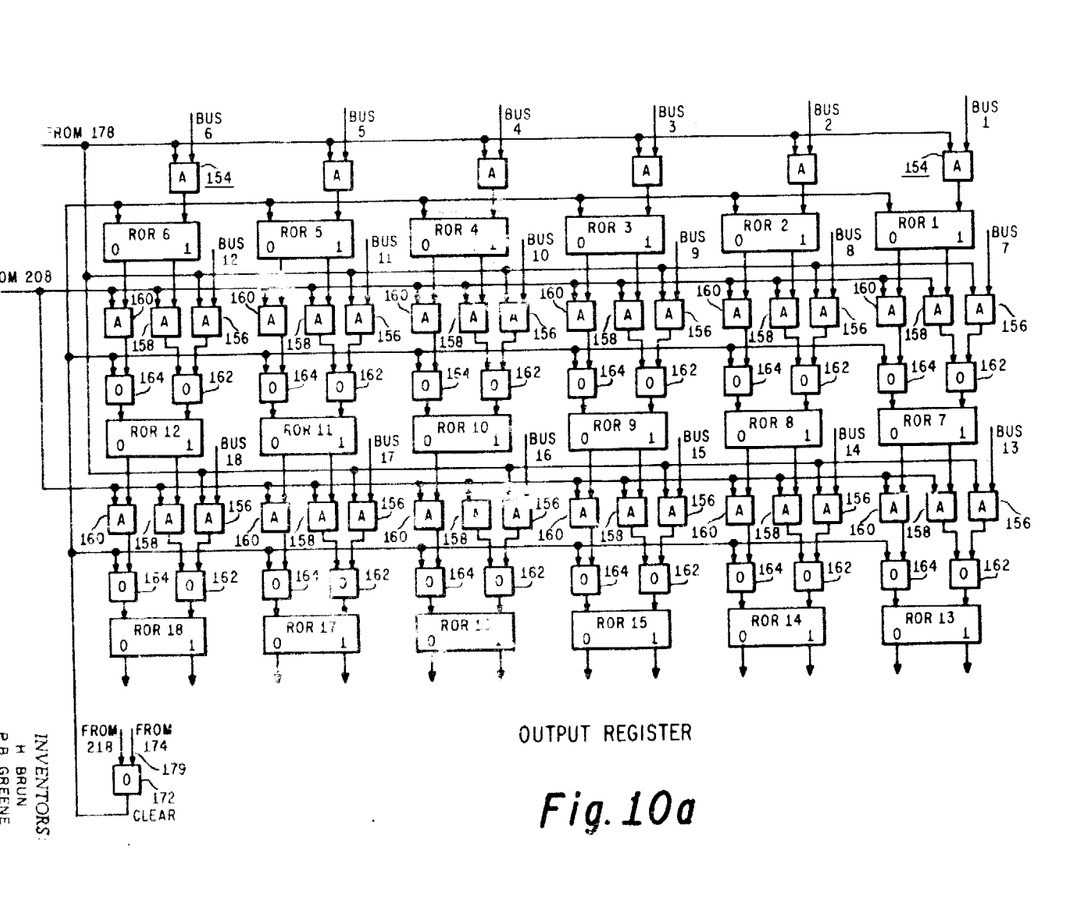
FIGS. 10a, 10b are logical representations of the output register; and,
FIGS. 11a, 11b, 11c are logical representations of the output control unit.
Figure 10B:
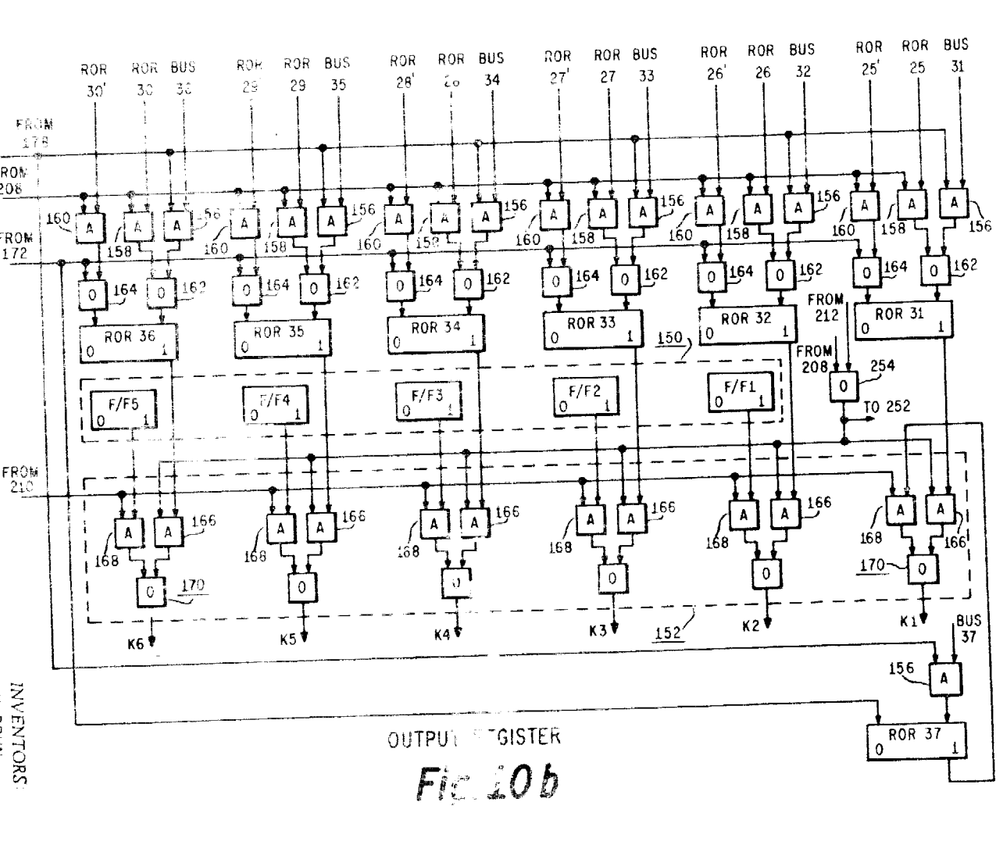

Before each transfer-in of information, a CLEAR signal is received from OR gate 172 (FIGS. 10a and 10b) which passes through OR gates 164 resetting ROR 1-37. (The manner in which the input signals to OR gate 172 are generated will be described below with reference to gates 174 and 218.) When information appears on buses 1-37 of main bus 28, AND gate 178 of control unit 26 (FIG. 11a) emits a signal which enables AND gates 154 and 156 to transfer it into stages 1-37. Since stages 14 through 30 and their associated logic are equivalent to stages 1 through 7, they are omitted from FIGS. 10a and 10b in order to simplify the drawings. Output register 24 is caused by a signal from AND gate 208 of output control unit 26 to shift data to the left since only the last six stages have output connections to the communications link. If a ONE is stored in a stage, the associated AND gate 158 is activated causing OR gate 162 to transmit a signal setting its corresponding stage. If a stage is in the reset condition, AND gates 160 send out a signal which passes through OR gates 164 resetting the corresponding stage. Thus, data may be shifted six places to the left.

In order —to transfer information out of stages ROR 31-36 to communication system 16 (FIG. 10b), OR gate 254 emits a signal, in a manner which will be explained with the reference to gates 208 and 212, which enables AND gates 166 to transfer it through OR gates 170 to lines K1-K6. As was mentioned previously, the first frame of the interpret-sign mode is stored in code flip-flops 150 and ROR 37. When this mode is in operation, AND gate 210 of output control unit 26, in a manner which will be described below, emits a signal enabling AND gates 168 to accomplish this transfer of information through OR gates 170 to lines K1-K6 for transmission to communication system 16.

Figure 11A:
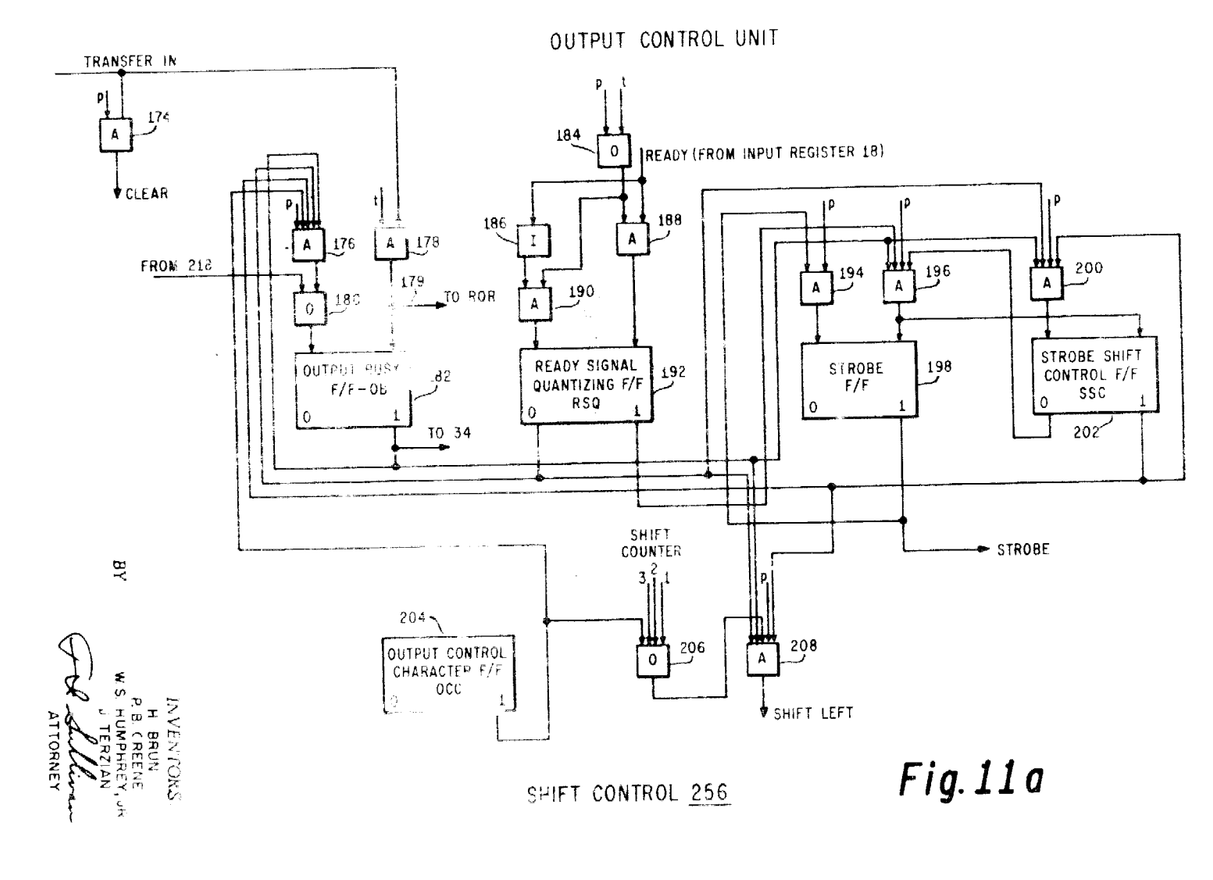
Figure 11B:
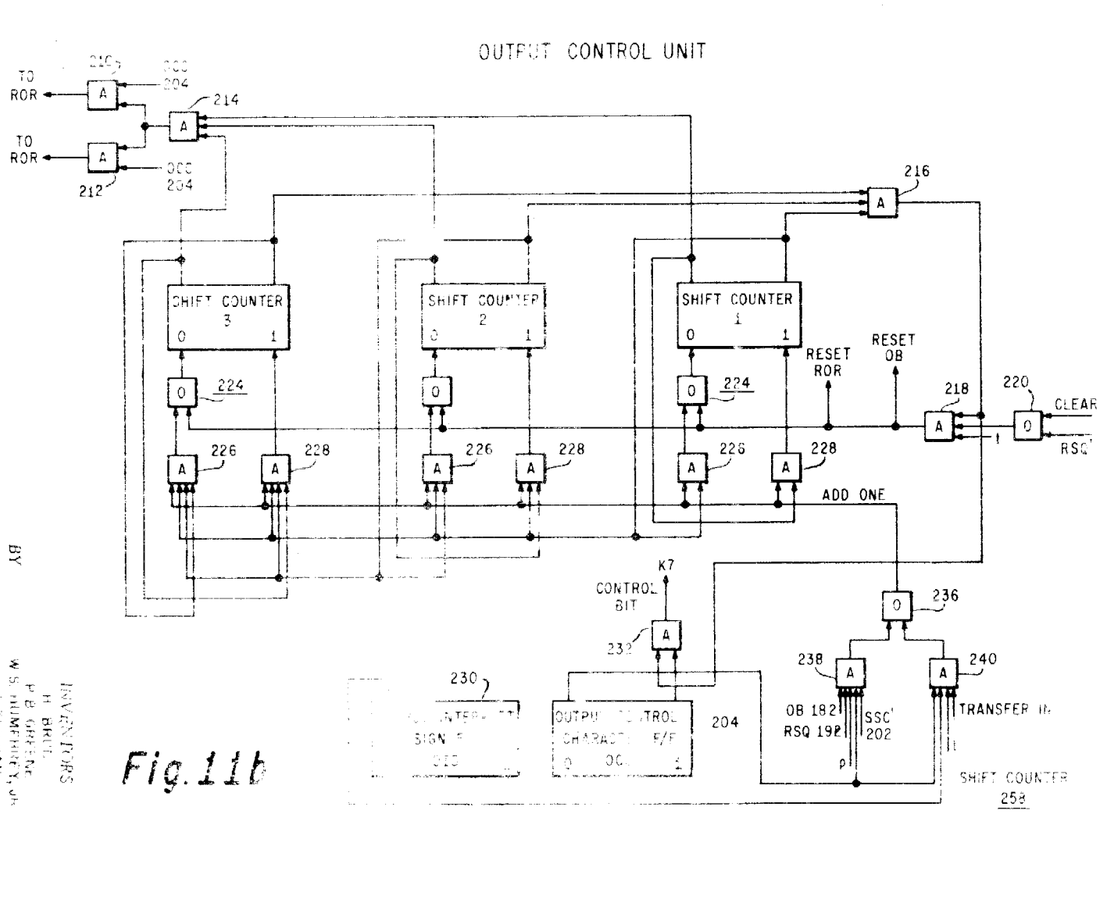
Figure 11C:
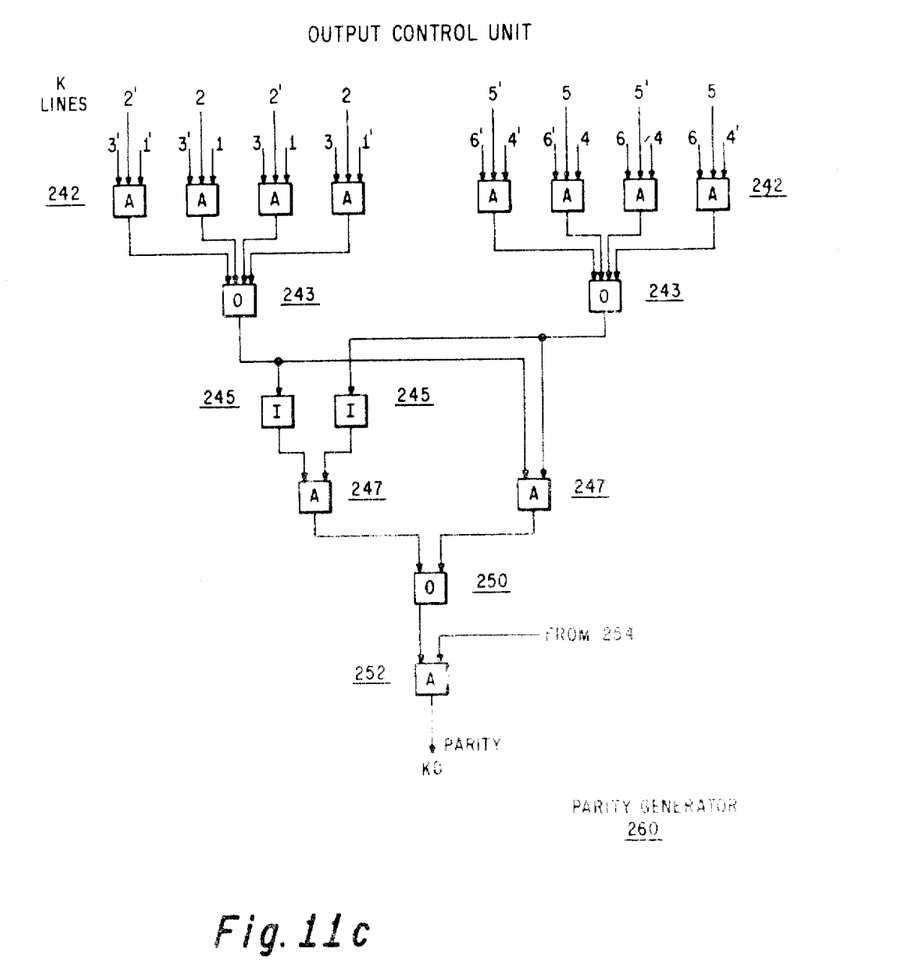

*Output control unit.*—Output control unit 26, shown in FIGS. 11a, 11b and 11c controls the emission of data from output register 24 and comprises a shift control unit 256, a shift counter unit 258 and a parity generator 260. Shift control unit 256 contains an output busy flip-flop 182, a ready signal quantizing flip-flop 192, a strobe flip-flop 198, a strobe shift control flip-flop 202, an output control character flip-flop 204, and their associated logic gates. It generates the STROBE signal to communication system 16 and the SHIFT LEFT signal to output register 24. Shift counter unit 258 comprises a three bit counter and associated logic gates and it counts the number of shifts by output register 24, controls the generation of information on to lines K1-K6, and generates control bit K7. The parity generator is a logic matrix for producing the odd parity bit which is transmitted over line K8.

There are a few control operations common to each mode so that they may now be collectively treated. When computer 10 is ready to transfer information into output register 24, it sends a TRANSFER-IN signal which together with a p pulse activates AND gate 174 (FIG. 11a) causing this register 24 to be cleared in the manner previously explained under the heading Output Register. Upon the occurrence of the following t pulse, AND gate 178 emits a signal, via conductor 179, to the output register 24 which allows the data on main bus 28 to enter this register and also sets output busy flip-flop 182 which sends a signal to the computer memory in-out register 34 to inhibit it from sending any further information.

When a READY signal is received from the communication system 16 indicating that input register 18 is in condition for accepting data and either a p or t pulse activates OR gate 184, AND gate 188 sends out a signal which sets the ready signal quantizing flip-flop 192. The set condition of output busy flip-flop 182, the reset condition of strobe shift control flip-flop 202, the set condition of ready signal quantizing flip-flop 192, and a p pulse enable AND gate 196 causing strobe flip-flop 134 and strobe shift control flip-flop 202 to be set. The set strobe flip-flop 134 generates the STROBE signal which lasts until the next p pulse causes AND gate 194 to reset it which prevents AND gate 208 from sending out the SHIFT LEFT signal.

As soon as the READY level drops, ready signal flip-flop 192 and strobe shift flip-flop 202 must be reset so as to be in condition for further processing action. A non-active ready line condition is inverted by INVERTER gate 186 whose output, together with a p or t pulse from OR gate 184, activate AND gate 190 causing the ready signal quantizing flip-flop 192 to be reset. The set condition of busy bit flip-flop 182, the reset condition of ready signal quantizing flip-flop 192, the set condition of strobe shift control flip-flop 202, and a p pulse enable AND gate 200 causing strobe shift control flip-flop 202 to be reset.

During the non-interpret-sign mode of operation, six frames must be sent and no more. Hence, it is the purpose of shift counter unit 258 (FIG. 11b) to count shifts and determine when a full word has been sent. Since it ordinarily counts to seven, some means must be provided to send only six frames. The reset condition of output interpret sign flip-flop 230 and the reset condition of control character flip-flop 204, which together indicate the non-terpret-sign mode, in association with the TRANSFER-IN signal from computer 10 and a t pulse activate AND gate 240 to emit a signal to counter stages 1–3 causing their contents to be incremented by one before any shifts are accomplished. The operation of these stages and that of their associated logic will be explained subsequently. Hence, the shift counter stages 1–3 will later register seven shifts when only six have been carried out and there will be no error in word generation. Each time output busy flip-flop 182 (FIG. 11a) is set, strobe shift control flip-flop 202 is not set, ready signal quantizing flip-flop 192 is set, output control character flip-flop 204 is not set and a p pulse occurs, AND gate 238 sends a signal signal through OR gate 236 causing shift counter stages 1–3 to be incremented by one. At this time, AND gate 208 in the shift control circuit (FIG. 11a) senses that output busy flip-flop 182 is set, ready signal quantizing flip-flop 192 is reset, strobe shift control flip-flop 202 is set, a p pulse has occurred, and that shift counter stages 1–3 (FIG. 11b) are not empty because of a ONE appearing at the output of OR gate 206, and it then generates a SHIFT LEFT signal.

After six shifts, stages 1–3 contain ONE's and this condition is sensed by AND gate 216 which transfers a signal to AND gate 218. This gate 218 senses this signal a t pulse, and either a CLEAR signal from AND gate 174 or the reset condition of ready signal quantizing flip-flop 192 and emits a signal. This passes through OR gates 224 resetting stages 1–3, clears output register 24 and causes output busy flip-flop 182 to indicate to computer 10 that output register 24 is in condition to receive more information.

For the interpret-sign mode of operation, computer 10 sets interpret-sign flip-flop 230 prior to transferring data into output register 24. With the exception of the first frame, the operation of this mode is the same as that of the non-interpret-sign mode. Since flip-flop 230 is set, AND gate 240 does not initially cause counter stages 1–3 to step to a count of one and they instead remain at zero.

AND gate 214 senses this condition and sends a signal to AND gate 210 which together with the reset condition of control character flip-flop 204 sends a signal to data output register 152 causing it to send the first frame over channels K1–K6.

In the control character mode, only one frame need be extracted from ROR 31–36 since only these stages contain information. Shift counter stages 1–3 are initially set at zero and AND gate 214 senses this condition and sends a signal to AND gate 212 which is activated because control character flip-flop 204 has been set by computer 10. A signal is transferred to OR gate 254 causing the control character to be transferred out. Since this is the only information stored, there is no need to shift left and new data may be transferred in. The set condition of output busy flip-flop 182, the reset condition of ready signal quantizing flip-flop 192, the set condition of strobe shift control flip-flop 202, the set condition of control character flip-flop 204, and a p pulse enable AND gate 176 to cause a signal to pass through OR gate 180 resetting output busy flip-flop 182. This allows the computer 10 to send new information and inhibits AND gate 208 from producing a SHIFT LEFT signal.

Shift counter unit 258 (FIG. 11b) is comprised of counter stages 1–3 and their associated logic gates. Any AND gate 228 sets its associated stage when this stage is in the reset condition, all stages to its right are in the set condition, and the ADD ONE signal is present. AND gate 226 causes OR gate 224 to reset its corresponding stage when it and all stages to its right are in the set condition and the ADD ONE signal is present. Thus, the operation of this unit is that of a conventional counter.

The parity generator 260 is shown in FIG. 11c. It comprises a logic matrix. Each OR gate 243 passes the odd parity bit for three bits appearing on the K lines. The manner in which this is accomplished has been explained for parity checker 246 and hence will not be repeated. If both parity bits are ZERO's, they are inverted by INVERTER gates 245 and the associated AND gate 247 passes a signal through OR gate 250. If both are ONE's the other AND gate 248 passes a signal through OR gate 250. When neither of these conditions exist, the output from OR gate 250 is a ZERO parity. Upon the occurrence of the signal from OR gate 254, AND gate 252 passes the parity bit for the information on lines K1–K6, which is the output from OR gate 250, on to line K8.

AND gate 232 (FIG. 11b) generates control bit K7 which is a ONE, to indicate that a control character is being processed, when control bit flip-flop 204 is set and a ZERO when it is reset. The state of flip-flop 204 is under computer program control.

*Use of control words*

Control words are extremely important in the real time system for dictating orders from one computer 10a to another 10b or for letting the other know of the occurrence of some happening. The following example of two computers 10 intercommunicating will demonstrate this capability for a case where errors have arisen while data is being transmitted over communication network 16.

Initially computer 10a intends to send out the following information: control word 1 indicating the start of a block, a block of information consisting of fifteen full length computer words, and control word 2 indicating the end of a block. This is all to be transferred from computer 10a, through output unit 12a, communicating system 16, input unit 14b, to computer 10b and is transferred in the form of the previously explained frames. Assume that an error arises in one of these frames as it passes through communication system 16. It will be discovered in parity checker 246 of input unit 14b and parity error flip-flop 142 is set. Computer 10b then senses this error and emits a control word which passes through output unit 12b, communication system 16, input unit 14a, to computer 10a telling it to repeat the last block. Computer 10a interprets this word and then acts accordingly by repeating the block. This time assume that there are no errors in transmission. After the total block is received, computer 10b sends out a control character to computer 10a acknowledging this receipt so that more information may be sent.

Although the preceding description of an illustrative embodiment of the invention has featured merely two data processing systems intercommunicating, it is to be understood that the invention is not limited to these specifics. For instance, one central system may be given the capability of conversing with many remote locations at different times. In such an installation, a system of dial-type control words could be used along with a switching center within the communications system for interpreting which remote location is being specified at a particular time by the contents of the control word from the central control. The trunk line to this location alone would then be actuated.

It should also be noted that many other embodiments of this invention will be readily apparent. For example, data may be processed in either serial or parallel form instead of the serial-parallel form described. Input and output storage locations may be specified by counting systems, by received data, or under program control within the receiving system. The recognition of the final frame of an output word may be accomplished by a counting device, by program control in the transmitting system, by external means such as data received through the input, or even by the transmitted data itself. Also, the completion of a received word may be indicated by a received signal, a counting device, a shifting register, or under program control.

A block diagram approach has been used throughout this specification to simplify the explanation. Those skilled in the electronic data processing art may readily implement these blocks with conventional component circuits from his own knowledge or such standard references as Arithmetic Operations in Digital Computers, by R. K. Richards (Van Nostrand Publishing Co.) and Pulse and Digital Circuits, Millman and Taub (McGraw-Hill Publishing Co.).

Accordingly, the invention is not limited to the preferred embodiment disclosed and should be afforded the full scope of the following claims.

What is claimed is:

1. In an electronic data processing system, a real time subsystem capable of processing control and data information and comprising: a first signal shifting buffer register for storing any one of several classes of multi-bit information words each class being characterized by a different word length; means for successively transferring groups of binary signal bits out of said register and shifting the remaining groups within said register; a first means for sensing at least some of said signal bits to characterize the type of information stored and to stop said shifting and transferring actions after a full word has been emitted; means for generating a parity signal for each of said groups; a second signal shifting buffer register for storing said groups; means for checking parity for each group; a communications means connecting said first register and said parity generator to said second register and said parity checker; means for successively transferring one of said groups from said communications means into said second register and shifting the groups within said second register; and, a second means for recognizing the type of information and stopping said transfer and shifting actions in said second register when a full word has been stored.

2. The invention according to claim 1 and wherein said first means for recognizing information type and stopping said shifting and transferring actions comprises a counter and a logic matrix.

3. The invention according to claim 1 and wherein said second means for recognizing information type and stopping said shifting and transferring actions comprises a code generator and logic means for sensing the location of said code in said second register.

4. A system arranged to allow two data processing units to communicate which comprises: a first data processing unit; a first storage means; a means for transferring data or control information from said data processing unit to said storage means; means for generating a control bit indicating whether said information is control information; a second storage means; communications means for transmitting said stored information and said control bit to said second storage means; a second data processing unit; an address register; means for transferring said information from said second storage means to said second data processing unit at a location specified by said address register; and, means for immediately interrupting operation of said second data processing unit when said control bit in said second storage means indicates control information.

5. A system arranged to allow two data processing units to communicate which comprises: a first data processing unit; a first means for storing any one of several types of multi-bit information words having varying word lengths; means for transferring an information word from said data processing unit to said storage means; means for causing said storage means to generate successive groups of said bits until a full word is generated; means for generating a control bit with each of said groups indicating whether said group comprises control information; means for generating a parity bit with each of said groups; means for generating a strobe signal with each of said groups; a communications system for transmitting said information groups, said control bits, said parity bits, and said strobe signals; a second means for storing said groups and forming a full word; means for sensing said strobe signals and transferring said groups from said communications system into said second storage means; a second data processing unit; means for transferring a full information word from said second storage means to said second data processing unit; and, means for immediately interrupting operation of said second data processing system when said control bit in said second storage means indicates control information.

6. In an electronic data processing system arranged for processing binary coded words of a given bit length ($n$) to represent a first type of information, binary coded words of said given length plus at least one additional bit ($n+1$) to represent a second type of information and binary coded words of less than said given length to represent a third type of information, apparatus comprising: an $n+1$ stage data processing register and means for causing said register to operate in a first mode for processing said first type of information, in a second mode for processing said second type of information, and in a third mode for processing said third type of information.

7. In an electronic data processing system having a central processor with a memory subsystem and the capability of processing binary coded words of a given bit length ($n$) to represent groups of alpha-numeric characters, binary coded words of said given length plus a sign bit ($n+1$) to represent numerical quantities and binary coded words of less than said given length to represent control characters, an input-out subsystem comprising: an input unit including an input register, an address register and an input control unit; an output unit having an output register and an output control unit; said input register and said output register each comprising a separate $n+1$ stage pulse shifting register; means for transferring data from said input register, said output register and said address register to said central processor; a plurality of means for causing said input register and said output register to each operate, respectively, in an interpret-sign mode for processing said numerical quantity words, in a non-interpret-sign mode for processing said alpha-numeric words and a control character mode for processing said control character words; said means for operating said input register in said interpret-sign mode including a sign bit location in said input register, means for receiving into the first $m$ stages of said input register (where $m<n$) a first $m$-bit sequence of binary coded signals capable of indicating that said interpret-sign mode of operation should be implemented, means for shifting said first $m$-bit sequence from said first stages further into said input register and for receiving additional $m$-bit sequences of binary digits representing said binary encoded numerical quantity into said first stages and from thence shifting them further into said register, said shifting being arranged to process said first $m$-bit sequence through successive groups of $m$-stages until it reaches a final $m$-stage group, means for sensing the presence of an $n+1$ sequence of binary digits in said input register, and means actuated by said sensing of $n+1$ digits to transfer the contents of said input register to a location in said central processor indicated by the data content of said address register; said means for causing said output register to operate in said interpret-sign mode including a sign bit location in said output register, means for transferring from said central processor to said output register $n+1$ length signal sequences representing said binary coded numerical quantity words, means (including means for sensing said sign bit location in said output register and an interpret-sign signal device) for generating a binary bit signal sequence indicating that an interpret-sign mode of operation should be implemented, a signal output subsystem, and means for transferring said interpret-sign sequence and said signals representing said numerical quantity to said output subsystem in a series of $m$-bit sequences; said means for operating said input register in said non-interpret-sign mode including said same previously mentioned means for receiving into said same first $m$ stages of said input register an $m$-bit sequence of binary coded signals which indicate that said non-interpret-sign mode of operation should be implemented, said same previously mentioned means for receiving and shifting additional $m$-bit sequences until an $n$-bit total sequence is contained within said input register, means for sensing the presence of said $n$-bit sequence in said register, and means actuated by said sensing of an $n$-bit sequence to transfer the contents of said input register to a location in said central processor indicated by the data content of said address register; said means for causing said output register to operate in said non-interpret-sign mode including means for transferring from said central processor to said output register $n$-bit length signal sequences representing said binary coded groups of alpha-numeric characters, means (including said interpret-sign signal device and a control character signal device) for generating a binary bit signal sequence indicating that a non-interpret-sign mode of operation should be implemented, and means for transferring said non-interpret-sign signal sequence and said signals representing alpha-numeric characters to said output subsystem; said means for operating said input register in said control character mode including said same previously mentioned means for receiving into a signal device other than one of said same first $m$ stages of said input register a signal indication that said control character mode of operation should be implemented, means for receiving into said first $m$ stages of said input register an $m$-bit sequence of binary coded signals representing a control character, and means for transferring said control character to said central processor; said means for operating said output register in said control character mode including a control character signal device for generating a signal indication that a control character mode of operation should be implemented, means for transferring from said central processor to said output register $m$-bit length signal sequences representing control characters, and means for transferring said control character signal indications and said control character signals to said output subsystem.

8. For an electronic data processing system including at least two stations, each having a central processor with a memory subsystem and the capability of processing binary coded words of a given bit length ($n$) to represent groups of alpha-numeric characters, binary coded words of said given length plus a sign bit ($n+1$) to represent numerical quantities and binary coded words of less than said given length to represent control characters, an input-output subsystem comprising: at one station, an input unit including an input register, an address register and an input control unit; at a second station an output unit having an output register and an output control unit; a multi-channel communications link connecting said input register and said output register; said input register and said output register each being connected in data transfer relationship to the central processor at their respective station and comprising a separate $n+1$ stage pulse shifting register; a plurality of means for causing said input register and said output register to each operate, respectively, in an interpret-sign mode for processing said numerical quantity words, in a non-interpret-sign mode for processing said alpha-numeric words and a control character mode for processing said control character words; said means for operating said input register in said interpret-sign mode including a sign bit location in said input register, means for receiving into the first $m$ stages of said input register (where $m<n$) a first $m$-bit sequence of binary coded signals capable of indicating that said interpret-sign mode of operation should be implemented, means for shifting said first $m$-bit sequence from said first stages further into said input register and for receiving additional $m$-bit sequences of binary digits representing said binary encoded numerical quantity into said first stages and from thence shifting them further into said register, said shifting being arranged to process said first $m$-bit sequence through successive groups of $m$-stages until it reaches a final $m$-stage group, means for sensing the presence of an $n+1$ sequence of binary digits in said input register, and means actuated by said sensing of $n+1$ digits to transfer the contents of said input register to a location in said central processor indicated by the data content of said address register; said means for causing said output register to operate in said interpret-sign mode including a sign bit location in said output register, means for transferring from said central processor to said output register $n+1$ length signal sequences representing said binary coded numerical quantity words, means (including means for sensing said sign bit location in said output register and an interpret-sign signal device) for generating a binary bit signal sequence indicating that an interpret-sign mode of operation should be implemented, a signal output subsystem, and means for transferring said interpret-sign sequence and said signals representing said numerical quantity to said output subsystem in a series of $m$-bit sequences; said means for operating said input register in said non-interpret-sign mode including said same previously mentioned means for receiving into said same first $m$ stages of said input register an $m$-bit sequence of binary coded signals which indicate that said non-interpret-sign mode of operation should be implemented, said same previously mentioned means for receiving and shifting additional $m$-bit sequences until an $n$-bit total sequence is contained within said input register, means for sensing the presence of said $n$-bit sequence in said register, and means actuated by said sensing of an $n$-bit sequence to transfer the contents of said input register to a location in said central processor indicated by the data content of said address register; said means for causing said output register to operate in said non-interpret-sign mode including means for transferring from said central processor to said output register $n$-bit length signal sequences representing said binary coded groups of alpha-numeric characters, means (including said interpret-sign signal device and a control character signal device) for generating a binary bit signal sequence indicating that a non-interpret-sign mode of operation should be implemented, and means for transferring said non-interpret-sign signal sequence and said signals representing alpha-numeric characters to said output subsystem; said means for operating said input register in said control character mode including said same previously mentioned means for receiving into a signal device other than one of said first $m$ stages of said input register a signal indication that said control character mode of operation should be implemented, means for receiving into said first $m$ stages of said input register an $m$-bit sequence of binary coded signals representing a control character, and means for transferring said control character to said central processor; said means for operating said output register in said control character mode including a control character signal device for generating a signal indication that a control character mode of operation should be implemented, means for transferring from said central processor to said output register $m$-bit length signal sequences representing control characters, and means for transferring said control character signal indications and said control character signals to said output subsystem.

9. For an electronic data processing system including at least two stations, each having a central processor with a memory subsystem and the capability of processing binary coded words of a given bit length ($n$) to represent groups of alpha-numeric characters, binary coded words of said given length plus a sign bit ($n+1$) to represent numerical quantities and binary coded words of less than said given length to represent control characters, an input-output subsystem comprising: at one station, an input unit including an input register, an address register and an input control unit; a multi-channel communications link connecting said input register and said output register; said input register and said output register each being connected in data transfer relationship to the central processor at their respective station and comprising a separate $n+1$ stage pulse shifting register; and, a plurality of means for causing said input register and said output register to each operate, respectively, in an interpret-sign mode for processing said numerical quantity words, in a non-interpret-sign mode for processing said alpha-numeric words and a control character mode for processing said control character modes.

10. The invention according to claim 9 wherein means is provided to indicate, via said communications link, that said input register is ready to receive data from said output register.

11. The invention according to claim 9 wherein means is provided to indicate, via said communications link, that said output register is ready to transfer data to said output register.

No references cited.

ROBERT C. BAILEY, *Primary Examiner.*

MALCOLM A. MORRISON, *Examiner.*

R. ZACHE, *Assistant Examiner.*